(12) United States Patent
McEwan et al.

(10) Patent No.: US 7,856,864 B2
(45) Date of Patent: Dec. 28, 2010

(54) DERIVING INFORMATION ABOUT LEAKS IN PIPES

(75) Inventors: Ian McEwan, Aberdeen (GB); Nicholas Ryan, Aberdeenshire (GB)

(73) Assignee: Brinker Technology Limited, Aberdeen (GB)

( * ) Notice: Subject to any disclaimer, the term of this patent is extended or adjusted under 35 U.S.C. 154(b) by 328 days.

(21) Appl. No.: 11/915,451

(22) PCT Filed: May 30, 2006

(86) PCT No.: PCT/GB2006/001979

§ 371 (c)(1),
(2), (4) Date: Nov. 26, 2007

(87) PCT Pub. No.: WO2006/126016

PCT Pub. Date: Nov. 30, 2006

(65) Prior Publication Data

US 2008/0196481 A1 Aug. 21, 2008

(30) Foreign Application Priority Data

May 27, 2005 (GB) .................... 0510766.9

(51) Int. Cl.
*G01N 3/28* (2006.01)
(52) U.S. Cl. .................................. 73/40.5 R
(58) Field of Classification Search ............. 73/40.5
See application file for complete search history.

(56) References Cited

U.S. PATENT DOCUMENTS

| | | | |
|---|---|---|---|
| 3,768,304 A * | 10/1973 | Hyde ...................... 73/40.5 R |
| 3,851,521 A | 12/1974 | Ottenstein | |
| 4,020,674 A * | 5/1977 | Fechter et al. ........... 73/40.5 R |
| 4,582,091 A | 4/1986 | Ells | |
| 4,890,483 A * | 1/1990 | Vetter ..................... 73/40.5 R |
| 5,349,568 A | 9/1994 | Kupperman et al. | |
| 5,361,622 A | 11/1994 | Wall | |
| 5,388,445 A | 2/1995 | Walters et al. | |
| 5,428,989 A | 7/1995 | Jerde et al. | |
| 5,708,193 A | 1/1998 | Ledeen et al. | |
| 6,212,942 B1 | 4/2001 | Hara et al. | |
| 6,348,869 B1 * | 2/2002 | Ashworth .................. 340/605 |
| 2003/0160391 A1 | 8/2003 | McEwan | |

FOREIGN PATENT DOCUMENTS

| | | |
|---|---|---|
| EP | 0042212 | 12/1981 |
| WO | 0186191 | 11/2001 |
| WO | 03093713 | 11/2003 |

* cited by examiner

*Primary Examiner*—David A. Rogers
*Assistant Examiner*—Rodney T Frank
(74) *Attorney, Agent, or Firm*—Daniel N. Lundeen; Lundeen & Lundeen PLLC

(57) ABSTRACT

A method and system for deriving fluid leak information are described. A plurality of sealing elements are introduced into the pipeline at a location upstream of the leak, and at least some of the sealing elements are drawn towards the leak to cause a sealing event which reduces fluid seepage. A pressure change caused by the sealing event is detected, and associated time data is used to derive information about the leak. In one embodiment, leak location information is derived. In an alternative embodiment, pressure transient information is used to derive leak size information.

29 Claims, 10 Drawing Sheets

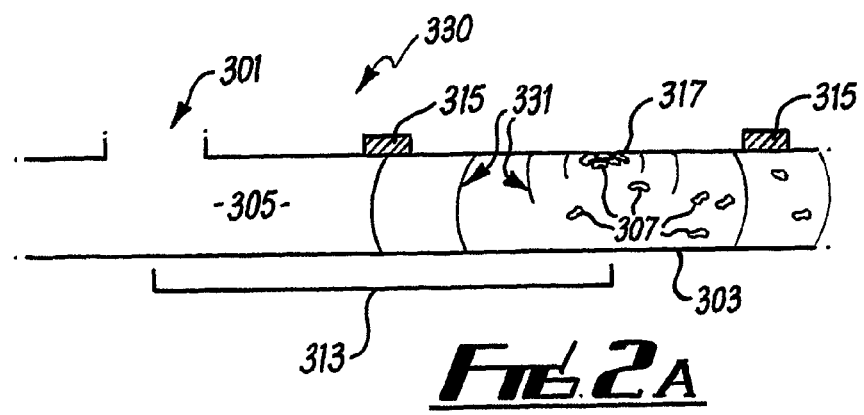
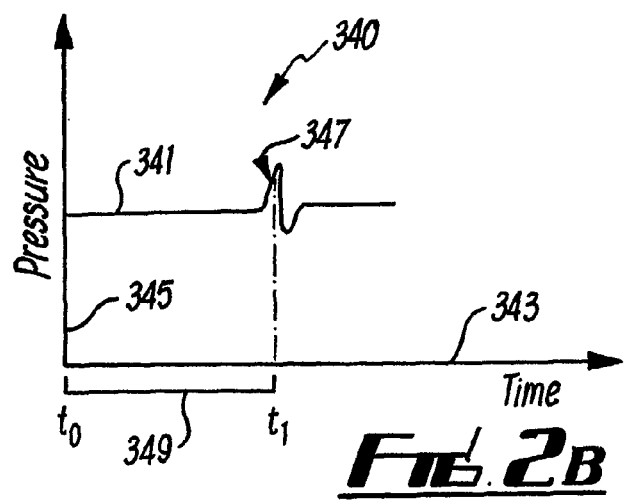
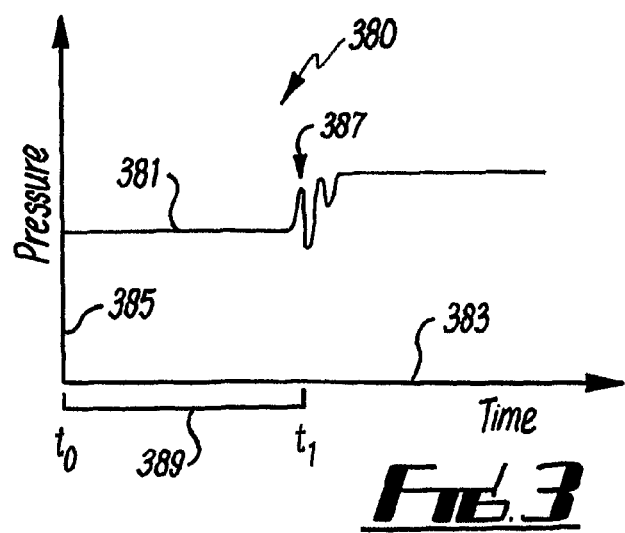

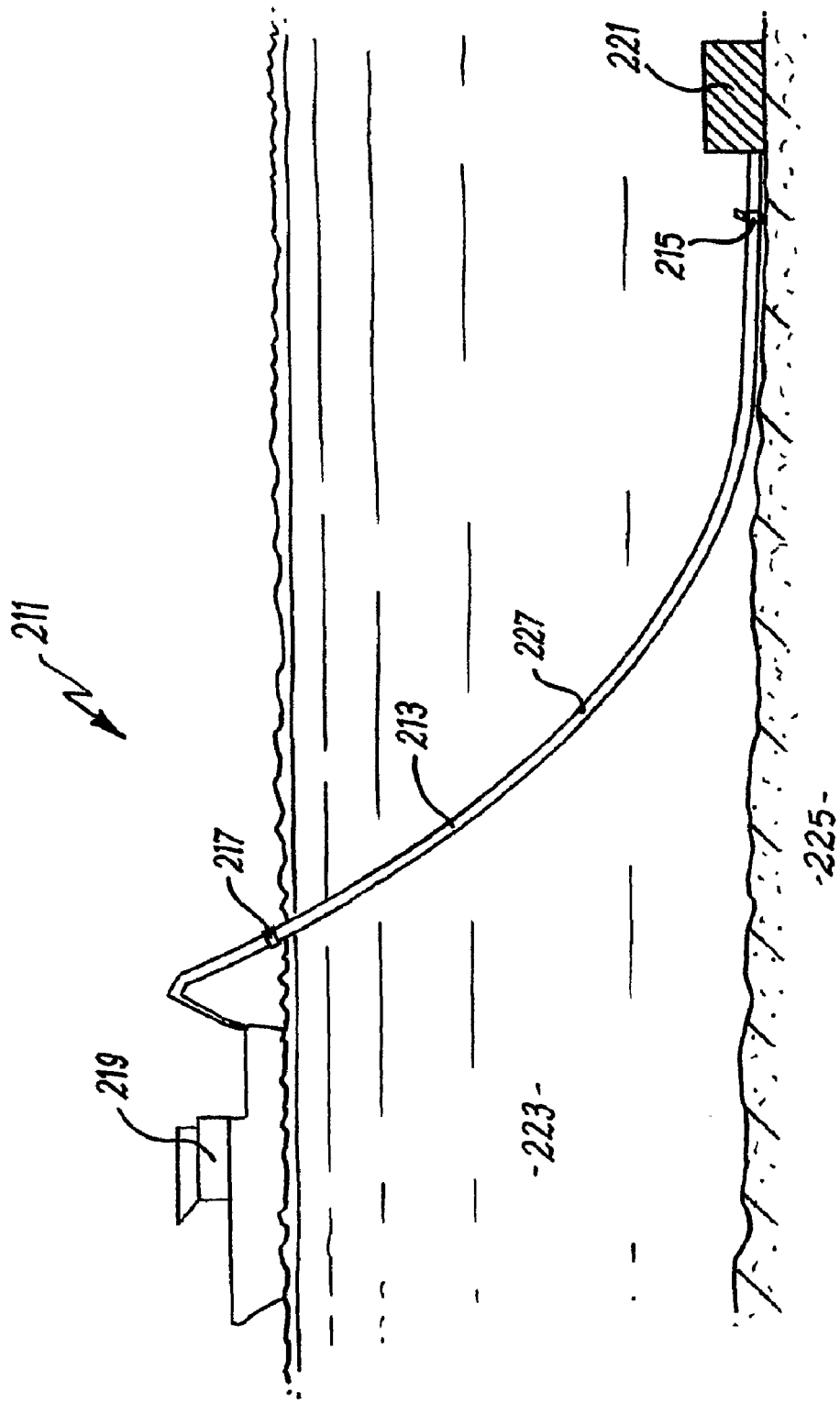

DERIVING INFORMATION ABOUT LEAKS IN PIPES

The present invention relates to a method and system for deriving information about leaks in pipes. In particular, the invention relates to a method and system for determining the location of a leak in a pipe. In another aspect, the invention relates to a method for determining the size of a leak. The invention provides a method suitable for remotely locating a leak in a fluid-carrying narrow bore pipeline, flowline or other suitable pressurised fluid system. The method may also be applied to small-bore pressure ducts of a non-circular cross-section.

Pipes facilitate transportation in and across regions, terrains or locations where manual transportation is inefficient or simply unfeasible. In such circumstances, pipes or pipe networks are typically constructed underneath the surface of the ground or, for example, on or underneath the sea bed, where they often extend for several kilometers. Installation of pipe networks is a time consuming and costly process and, as a result, they are generally designed to operate as permanent installations. In the oil industry sub-seabed pipelines are often used to transport fluid hydrocarbons from a producing platform to an onshore refinery terminal.

Pipeline systems, particularly those installed in harsh environments, become susceptible to damage over time and require maintenance. Often leakages will occur resulting in loss of the fluids transported in the pipeline causing damage to the environment and loss of potential profits to the operators. Maintenance and proper installation are significant issues.

In offshore pipelines there are significant costs associated with repairing a leak. The costs may be reduced by determining where the damaged section of the pipe is located before conducting repairs. This minimizes any excavation or other preparation that may be required near the pipeline before carrying out repairs. Leak location information is also important for understanding failure modes at post-commissioning stages helping to prevent pipe failures of future operation.

Existing techniques employed for determining the location of leaks and for repairing leaks in pipelines have limitations. Traditional methods often use devices that are deployed in the pipeline and actively scan the pipeline for leaks. In some cases, this may require shutting down parts of a pipeline network to provide access.

More recently, passive methods have been developed such as deploying a capsule with a sensor into the fluid already flowing in the pipeline. EP 1,137,921 discloses such a system, where the capsule is introduced to the flow and senses pressure differentials as it travels with the flow. Anomalous pressure data obtained near the leak provides useful information concerning the leak location. Data are transferred to a computer, for example, remotely transmitted using wireless communication means or locally by connecting a computer to a capsule after retrieving the capsule. In documents WO 01/86191 and WO 03/093713, there is disclosed the use of similar capsules that have tagged sealing elements. These capsules locate the leak and then release elements into the fluid near the leak to seal the leak.

Techniques using mobile capsules may be problematic in certain types of pipelines. In particular, offshore pipelines that extend long distances in deep water make it difficult to successfully communicate and transmit data from the capsule to a surface computer. In narrow bore pipelines, the capsule dimensions may be too small to enable the capsule to be easily retrieved back to the surface for manual download of data to a computer. Furthermore, the requirement of complex engineering solutions using advanced materials for the application of capsule systems in pipelines with extreme dimensions can be prohibitively expensive.

The documents WO 01/86191 and WO 03/093713 provide solutions to the sealing of leaks in such fluid-carrying lines for sealing without needing to engineer capsules to first locate the leak. In these methods, sealing elements are introduced into the fluid carrying pipeline, become suspended in the fluid by virtue of their density and size, and travel to the leak following the natural flow of the fluid and the pressure gradients that occur in the pipeline fluid as a result of the leak. Sealing elements are formed according the pipeline dimensions and nature of the fluid flowing in the pipeline.

These leak sealing solutions have been used successfully in umbilical pipelines, which typically extend several tens of kilometers in offshore environments, for example, providing fluid to or from seabed installations. However, only the traditional techniques, such as using capsules with sensors, are available to locate the leaks in the pipelines. Alternative methods for locating leaks in such umbilical lines have not been forthcoming due to their inaccessibility and dimensions making them unsuitable for using existing detection techniques.

It is one aim of an aspect of the present invention to mitigate or at least obviate deficiencies and shortcomings of prior methods for locating leaks in fluid-carrying lines and pipes.

It is another aim of an aspect of the present invention to provide a method and system for remote detection of the location of a leak in a fluid bearing pipeline.

A further aim of an aspect of the invention is to provide a method for determining the size of a leak in a pipe.

Other aims and objects of the invention will become apparent from reading the following description.

According to a first aspect of the invention there is provided a method for determining the location of a fluid leak in a pipeline, the method comprising the steps of:

Introducing a plurality of sealing elements into the pipeline at a first location upstream of the leak, at least some of the sealing elements being drawn towards the leak to cause a sealing event which reduces fluid seepage from the leak;

Detecting a pressure change due to the sealing event;

Using time data associated with the pressure change to derive leak location information.

Preferably, the method further comprises the additional step of measuring the time between the introduction of the sealing elements into the pipeline and the pressure change. More preferably, the method further comprises the additional step of using rate of flow of fluid in the pipeline to calculate a distance between the first location and the leak location.

Optionally, the pressure change is detected using a single pressure transducer located in the pipeline. Optionally, the pressure change is detected using a plurality of pressure transducers located in the pipeline.

Preferably, the method further comprises the step of measuring flow rate of the fluid in the pipeline. More preferably, the method further comprises the step of calculating the leak location using the time of introduction of the sealing elements, the time of the pressure change, and the flow rate of the fluid.

Optionally, the pressure change is a change of steady state pressure of the fluid in the pipeline. Optionally, the pressure change is a transient pressure change of the fluid in the pipeline.

In one embodiment, the detected pressure change is a combination of a change of steady state pressure of the fluid in the pipeline and a transient pressure change of the fluid in the pipeline.

Preferably, the method further comprises the steps of:
Detecting a first signal due to a pressure transient caused by the sealing event;
Detecting a second signal due to a pressure transient caused by the sealing event;
Deriving leak location information using time data associated with the first and second signals.

Preferably, the first signal is detected by a first pressure transducer at a location upstream of the leak, and the second signal is detected by a second pressure transducer at location downstream of the leak.

Preferably, leak location information is derived from a characteristic pressure transient speed in the fluid, the time of detection of pressure transients at the first and second transducers, and the location of the first and second transducers.

Preferably, the first signal is a primary pressure transient detected by a pressure transducer, and the second signal is a reflected pressure transient detected by the pressure transducer.

Preferably, the method comprises the further step of measuring a characteristic pressure transient speed in the fluid by generating a pressure transient at a known location and time, and detecting a resulting signal at a pressure transducer.

Preferably, the method comprises the additional steps of measuring the amplitude of a pressure transient caused by the sealing event, and deriving leak size information from the measured amplitude.

According to a second aspect of the present invention there is provided a system for deriving the location of a fluid leak in a pipeline, the system comprising the steps of:
An inlet for allowing a plurality of sealing elements to be introduced at a pipeline at a first location upstream of the leak, at least some of the sealing elements being drawn towards the leak to cause a sealing event which reduces fluid seepage from the leak;
Means for detecting a pressure change due to the sealing event;
Means for deriving leak location information from time data associated with the pressure change.

Preferably, the means for detecting a pressure change is a single pressure transducer located in the pipeline. Preferably, the single pressure transducer is located upstream of the leak.

More preferably, the means for detecting a pressure change comprises a first pressure transducer located upstream of the leak and a second pressure transducer located downstream of the leak.

Preferably, the system further comprises means for measuring the flow rate of fluid in the pipeline. Preferably, the system further comprises means for generating a pressure transient in the pipeline at a known time and location.

According to a third aspect of the present invention, there is provided a method for determining the size of a fluid leak in a pipeline, the method comprising the steps of:
Introducing a plurality of sealing elements into the pipeline at a first location upstream of the leak, at least some of the sealing elements being drawn towards the leak to cause a sealing event which reduces fluid seepage from the leak;
Detecting a pressure transient signal caused by the sealing event;
Measuring an amplitude of the pressure transient signal;
Deriving leak size information from the amplitude of the pressure transient signal.

Preferably, the method comprises the further step of determining leak location in accordance with the method of the first aspect of the invention.

According to a fourth aspect of the invention there is provided a system for determining the size of a fluid leak in a pipeline, the system comprising:
An inlet for allowing a plurality of sealing elements to be introduced into a pipeline at a first location upstream of the leak, at least some of the sealing elements being drawn towards the leak to cause a sealing event which reduces fluid seepage from the leak;
Means for detecting a pressure transient signal due to the sealing event;
Means for measuring the amplitude of the pressure transient signal, and;
Means for deriving leak size information from the amplitude of the pressure transient signal.

Optionally, the pipeline of the first, second, third or fourth aspects of the invention is a part of an installation used in the production of hydrocarbons. The pipeline may be an offshore pipeline. The pipeline may be a narrow bore pipeline, such as an umbilical.

There will now be described, by way of example only, embodiments of the invention with reference to the following drawings, of which:

FIG. 2A is a section view of a pipeline having a sealed leak and resulting pressure transients in accordance with an embodiment of the invention;

FIG. 2B is a graph of pressure responses with time detailing pressure transient arrivals in accordance with the embodiment of FIG. 2A;

FIG. 3 is a graph of pressure responses combining pressure transient and steady state changes in accordance with an embodiment of the invention;

FIG. 12 is a schematic representation of a practical pipeline leak location setup in accordance with an embodiment of the invention.

Figure 1A:
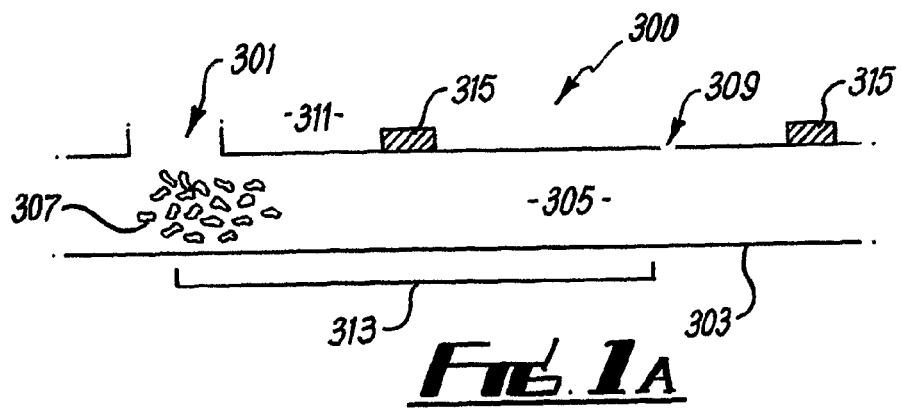
FIG. 1A is a section view of a pipeline containing a leak and sealing element inlet in accordance with an embodiment of the invention.
Figure 1B:
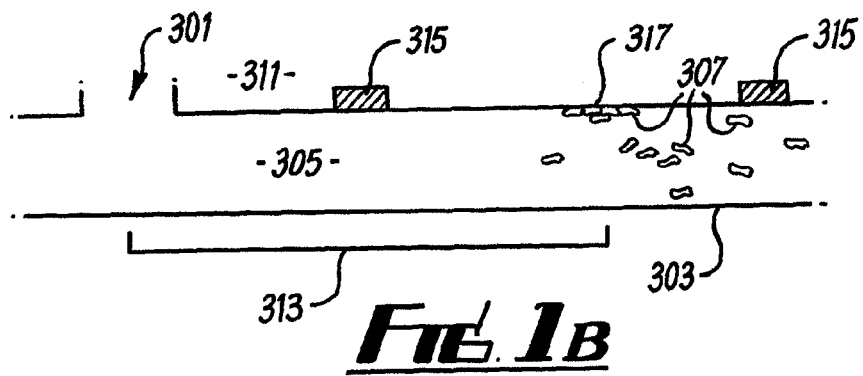
FIG. 1B is a section view of a pipeline having a sealed leak in accordance with the embodiment of FIG. 1A.
Figure 1C:
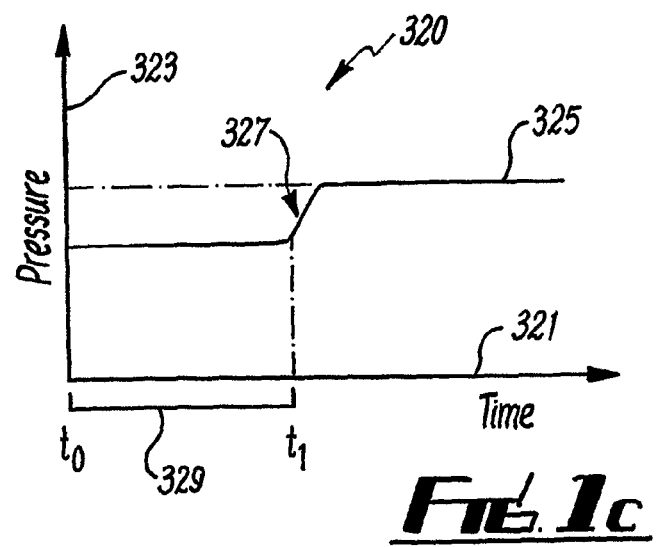
FIG. 1C is a graph of steady state pressure responses with time in accordance with the embodiment of FIG. 1A.

Referring firstly to FIGS. 1A, 1B and 1C, there is shown schematically a first embodiment of the present invention, in which the timed release of sealing elements and sealing of a leak is used to determine the location of a leak in a pipeline. With specific reference to FIG. 1A, there is generally depicted at 300 a pipeline 303 with a leak 309 and sealing element inlet 301. The inlet 301 to the pipeline 303 carrying fluid 305 is provided to allow sealing elements 307 to be introduced into and suspended in the flow of fluid 305 through the pipeline 303. The pipeline 303 contains a leak 309, which exposes the fluid 305 flowing through the pipeline 303 to the pressure of the environment 311 external to the pipeline 303. In general, the pressure of the environment 311 and the pressure of fluid in the pipeline is different giving rise to a pressure gradient in the pipeline fluid 305, which increases toward the leak locality. The sealing elements are carried downstream with flow along the pressure gradient to the leak location. The leak 309 is located an arbitrary distance 311 from the sealing element inlet 301. The pressure of the pipeline fluid 305 is measured using pressure transducers 315 mounted to the pipeline 303.

FIG. 1B shows the pipeline 303 after the sealing elements 307 have traveled with the flow downstream and a pressure resistant seal 317 is created at the location of the leak 309 of FIG. 1A. At this stage, the sealing elements 307 that are not used for sealing the leak pass downstream through the pipe 303.

In this embodiment of the invention, the time, $t_0$, at which the sealing elements 307 are released into the pipeline is recorded whilst the pressure is monitored at transducers 315. FIG. 1C is a line graph depicting pressure measured at one of the transducers 315 at different stages in the sealing process as described in the embodiment of FIGS. 1A and 1B. The graph 320 has abscissa axis 321 as time and ordinate axis 323 as pressure. The trace 325 represents the pressure variation with time from the time at which sealing elements 307 are introduced to the fluid 305 until after the leak 309 has been sealed at 317. On sealing, downstream equipment reacts to the increased flow by an increase in back pressure, and this pressure change is reflected throughout the pipeline. The time at which the pressure increase 327 occurs corresponds to the time at which the sealing elements 307 seal the leak 309 and is denoted $t_1$. The time taken for the sealing elements to travel from the inlet 301 to the leak location at which it is sealed is $t_1-t_0$ can be related to the dimension 329.

In order to calculate the distance to the leak 309 from the inlet 301, knowledge of the rate of flow in the pipeline 303 is required to estimate the transit time of the sealing elements. The mean flow velocity provides a proxy for the speed of the sealing elements 307 travelling with the flow from the inlet 301 to the leak 309. An estimate of the mean flow velocity (v) may be derived from the flow rate (Q) and the pipe diameter (D) using the following equation:

$$Q = v \times \pi D^2/4$$

The time 329 at which the pressure increases in the graph 320 at 327 is taken to correspond to the time taken for the sealing elements 307 to travel from the inlet 301 to the leak 309. An estimate of distance 313 to the leak is obtained by multiplying the mean flow velocity by the time $t_1-t_0$ 329 required for the sealing elements 307 to arrive at the leak location. In certain circumstances, a more refined estimate of the distance 313 may be obtained by introducing a factor to account for any difference between the mean flow velocity and the velocity of the sealing elements. In this embodiment, the flow rate is estimated from historical data or operating parameters of the pipeline, or existing on-line measurement systems. However, in an alternative arrangement, the system may be provided with a flow rate measurement device located within the pipeline.

In practical tests using the above method, repeat measurements using one transducer 315 suggest that, determination of the leak position is possible to within 10% of the actual distance 313 between the inlet 301 and the leak 309. Use of a number of transducers 315 to record pressure changes can help to reduce statistical uncertainty associated with the measurements, for example, using averaging techniques over an array of transducers.

The above-described embodiment details the determination of the position of a leak from sealing the leak using sealing elements that are passively emplaced at the leak by the fluid flow in the pipeline. This method requires only one pressure transducer located along the pipeline for measuring pressure, time measuring apparatus, and a knowledge of pipeline flow rate. The simplicity of the equipment and setup required to determine the leak location makes this a highly cost-effective method.

FIG. 2A depicts schematically a second embodiment of the present invention, implemented in the pipeline of the embodiment of FIGS. 1A to 1C. FIG. 2B is a graph of the corresponding pressure response at 340. In FIG. 2A, the pipeline 303 is shown after introduction of the sealing elements 307 and after a seal 317 of the leak 309 has occurred as in the embodiment of FIG. 1B. In this case, however, the sealing event produces transient pressure waves 331, which are recorded as pressure variations at the transducers 315.

The magnitude of the transient ($\Delta p$) is given by:

$$\Delta p = -\rho \Delta V c$$

where $\rho$ is the density of the fluid $\Delta V$ is the step change in the velocity in the pipeline due to the sealing of the leak c is the speed of sound in the fluid Preferably, for a transient to be generated, a single sealing element will provide a near instantaneous seal of the leak. For linear or larger leaks (e.g. cracks or weld defects) several sealing elements may act in concert to seal the leak. In this case for a single transient to be generated, the combined sealing action must take place within a time interval $\Delta T$ such that $\Delta T$ is less than $2 L/c$, where L is the line length, and c is the speed of sound in the fluid.

The graph 340 of FIG. 2B depicts this pressure transient variation. The trace 341 indicates the variation of pressure with time and at the time 349 after introduction of the sealing elements 307, the pressure transient 331 is observed as a distinct pressure pulse 347.

The calculation of the leak location is carried out in a manner similar to the above embodiment of FIGS. 1A to 1C. In this case though, the time of the transient pressure change 347 observed in the pressure measurements 341 is used as the time for arrival at the leak of the sealing elements. This method is advantageous in situations where the steady state change in pressure, as described in the above embodiment, is difficult to detect.

It should be understood that a pressure change due to both a steady state pressure increase and pressure transients arise in the pipeline fluid due to a single sealing event. FIG. 3 is a graph of the pressure response measured at one of the transducers 315 of the above embodiments, where the trace 381 indicates the effect of both a steady state rise in pressure and pressure transients due to the sealing of the leak. The combined pressure event 387 occurs at the time 389 after the introduction of the sealing elements 307. Leak location is calculated as above using the time 389 to represent the time for the sealing elements 307 to travel from the inlet point 301 to the leak 309.

Using the combined pressure signal available from pressure transients and the steady state pressure change, a clearer indication of the time of the sealing is provided, and therefore the leak location can be estimated with greater accuracy. Furthermore, the combined effects may help to diagnose a sealing event, particularly in pipelines with significant ambient noise.

Figure 4A:
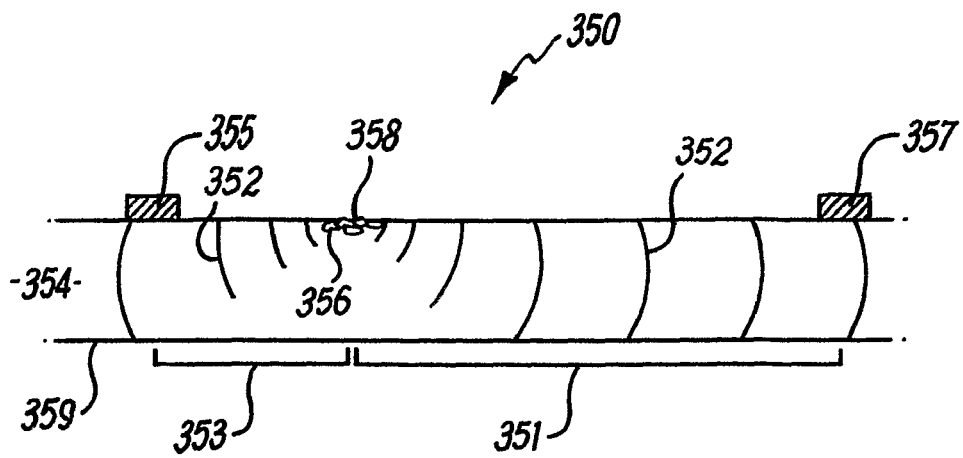
FIG. 4A is a section view of a pipeline with pressure transients due to a leak, in accordance with an embodiment of the invention.
Figure 4B:
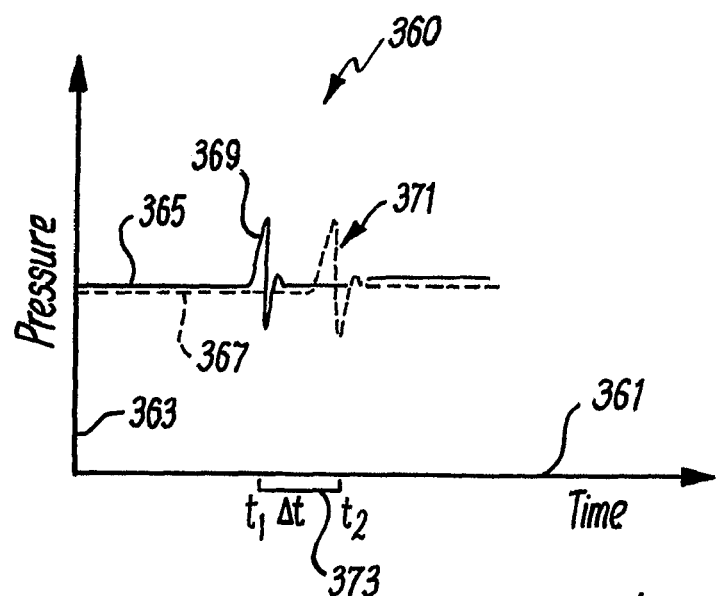
FIG. 4B is a graph of the pressure response with time detailing pressure transient arrivals in accordance with the embodiment of FIG. 4A.

FIGS. 4A and 4B schematically show a further embodiment of the present invention, in which pressure transients are used to determine the leak location relative to the measurement points. This method of determination does not require determination or estimation of the speed of or distance traveled by sealing elements flowing to the leak.

With reference to FIG. 4A, a section of pipeline 359 with fluid 354 flowing through it is generally depicted at 350. The pipeline 350 is shown after forming a seal 358 of a leak having introduced sealing elements 356 to the fluid flow in a manner similar to the above-described embodiments. A pressure transient wave 352 is generated in response to the sealing of the leak in the pipeline 359 and travels away upstream and downstream from the leak location. Along the pipeline 359, there is mounted an upstream transducer 355 located upstream of the leak location and a downstream transducer 357 located downstream of the leak location for monitoring pipeline fluid pressure. In this case, the transducers 355 and 357 are configured to have a resolution appropriate to detect the pressure transient variations 352 with time. The distance 353 from the upstream transducer 355 to the leak and the distance 351 from the downstream transducer 357 to the leak are indicative of leak location, as the positions of the transducers along the pipeline are known.

In FIG. 4B, a graph of the pressure variation with time measured at the transducers is generally depicted at 360. The pressure variation with time measured at the upstream transducer 355 is represented by the trace 365 and the pressure variation with time measured at the downstream transducer 357 is represented by the trace 367 of the graph 360. Arrival of pressure transients 352 at the upstream transducer 355 is indicated by the anomaly 369 of the pressure trace 365 and at the downstream transducer 357 is indicated by the anomaly 371 of the pressure trace 367. A time difference, $\Delta t$, 373 is determined from the arrival times, $t_1$ and $t_2$, of the transient at the upstream and downstream transducers.

In this embodiment, calculation of leak location using the arrival time information requires determination of the speed that the transients propagate through the fluid in the pipeline. Theoretically, the pressure transients 352 due to the sealing event travel from the leak location to the transducer at a characteristic speed of pressure waves of the pipe and fluid system. The characteristic speed of pressure waves of the pipe and fluid system is determined by providing a pressure signal to the fluid, for example, by shutting and opening a valve in the flow, and measuring the time that the signal takes to travel a certain distance, for example, between two pressure transducers. The characteristic speed allows distances to be calculated from the time differences.

The time difference 373 between arrival times, $t_1$ and $t_2$, at the upstream and downstream transducers 355 and 357, dividing by characteristic velocity, corresponds to the difference between the distances of the two transducers to the leak.

For example, should the leak be located exactly half way between the two transducers, the transients should arrive at each transducer at the same time and the difference in distance is zero. The distance 353, denoted A, is given by the formula:

$$A = 1/2 \times [(A+B) - (v_{ch} \times \Delta t)],$$

where the characteristic velocity is $v_{ch}$, $\Delta t$ is time difference between the time of arrival time of the transients at the downstream and upstream transducers, B is the distance from the leak to the downstream transducer, and (A+B) is the distance between the upstream and the downstream transducer. The distance 353, or A, determines the position of the leak relative to the position of the upstream transducer 355.

Figure 5A:
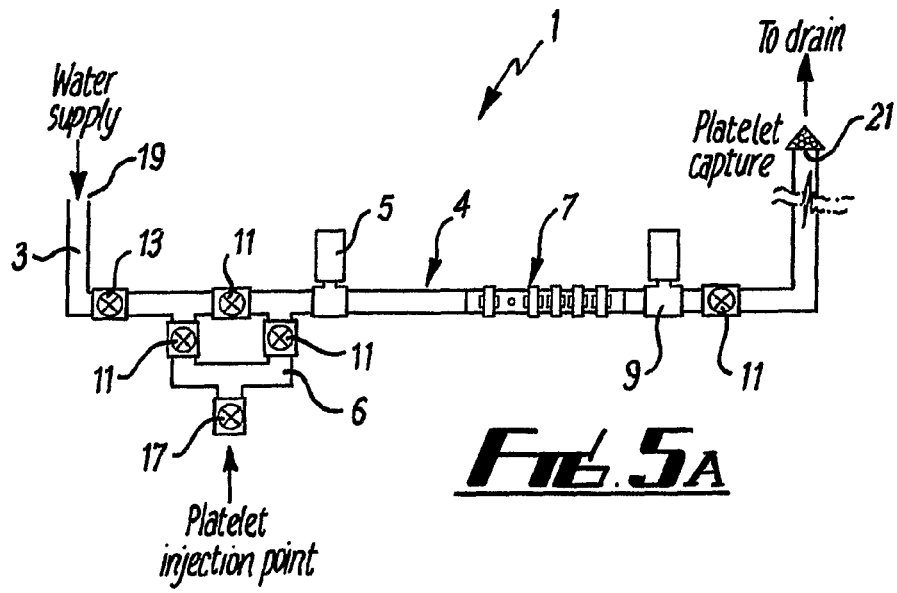
FIG. 5A is a schematic representation of small-scale test rig in accordance with the present invention.
Figure 5B:
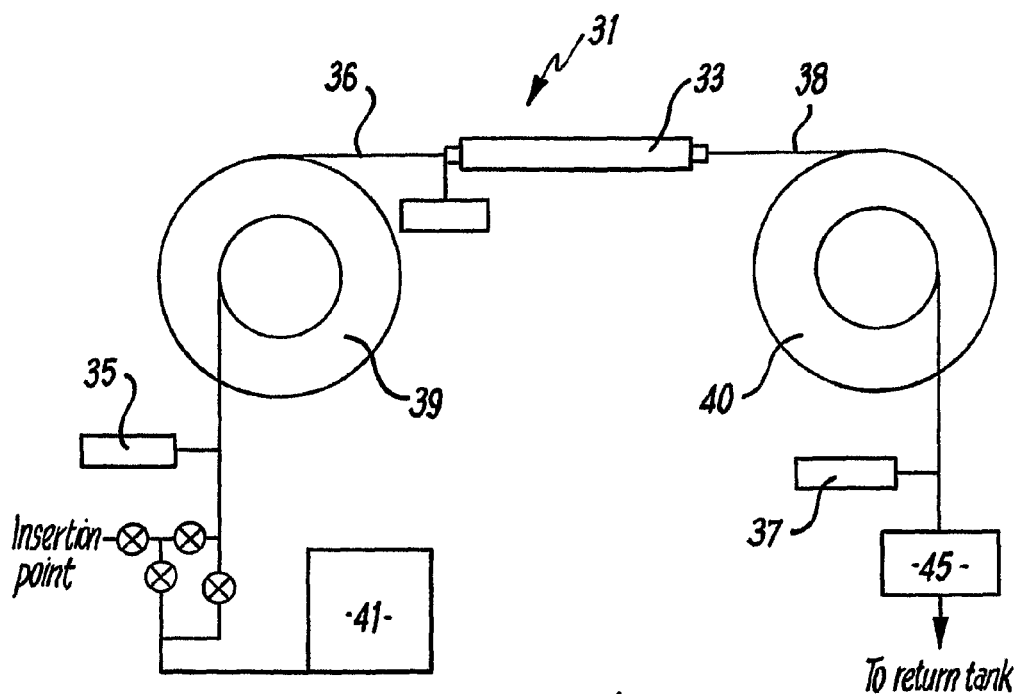
FIG. 5B is a schematic representation of a large-scale test rig in accordance with the present invention.

The reliability of this method in practice was examined by carrying out tests using small-scale and large-scale laboratory facilities shown schematically in FIGS. 5A and 5B respectively.

The small-scale test rig 1 comprises a pipeline through which water is supplied at one end of the test pipeline 19 and drained at a second far end of the pipeline 3. The water supply 19 is directed through the pipeline from the first near end to the second far end at pressure, which is generated by locating the water supply 15 m above the main section 4 of the pipeline 3. In the main section 4 of the pipeline, there is provided a test section 7 of pipe containing a small-diameter hole for simulating leakage of a pressurised fluid in the pipeline to the atmosphere. The test section 7 is interchangeable with the different sections having different size leaks.

At each end of the test section 7 the pressure of the fluid within the pipeline is measured by an upstream pressure transducer 5 and a downstream pressure transducer 9. An elevated end section near outlet 21 provides a potential against which pressure may be generated in the pipe 3.

The large-scale test rig 31 comprises an upstream line portion 36 spooled on to a drum 39, a test section 33 having a hole for replicating a leak and a downstream line portion 38 spooled on to a drum 40. The test section 33 is located and connected between the upstream and downstream lines 36 and 38, and is interchangeably attached as in the small-scale setup 1 in FIG. 5A, allowing tests for different size leaks to be carried out. In the large-scale system 31, a pump 41 is used to pump fluid through the line at high pressure. Pipeline fluid pressure is generated against a back pressure associated with the lines spooled onto the drums 39 and 40. Pressure is monitored by three pressure transducers, one upstream transducer 35, a downstream pressure transducer 37, and, in addition, a transducer at the leak location in the test section 33.

During tests, pressure is continuously monitored by the pressure transducers upstream and downstream of the test section, and, in the case of the large-scale tests, also at the test location. The holes in the test sections are sealed and the pressure variations observed and recorded. Recordal of the pressure in the pipeline is carried out by connecting the pressure transducer to a data logger which in turn feeds into a computer allowing analysis of multi channel pressure data. Sampling rates of the data logger and transducers 7 are high, for example 1 to 5 kHz, in order to obtain good resolution. As the leaks in the test section are sealed, resulting pressure changes are recorded at the transducers accordingly.

In the tests carried out using the systems of FIGS. 5A and 5B, pressure signals recorded at the pressure transducers of the pipelines are recorded as a function of time.

Figure 6:
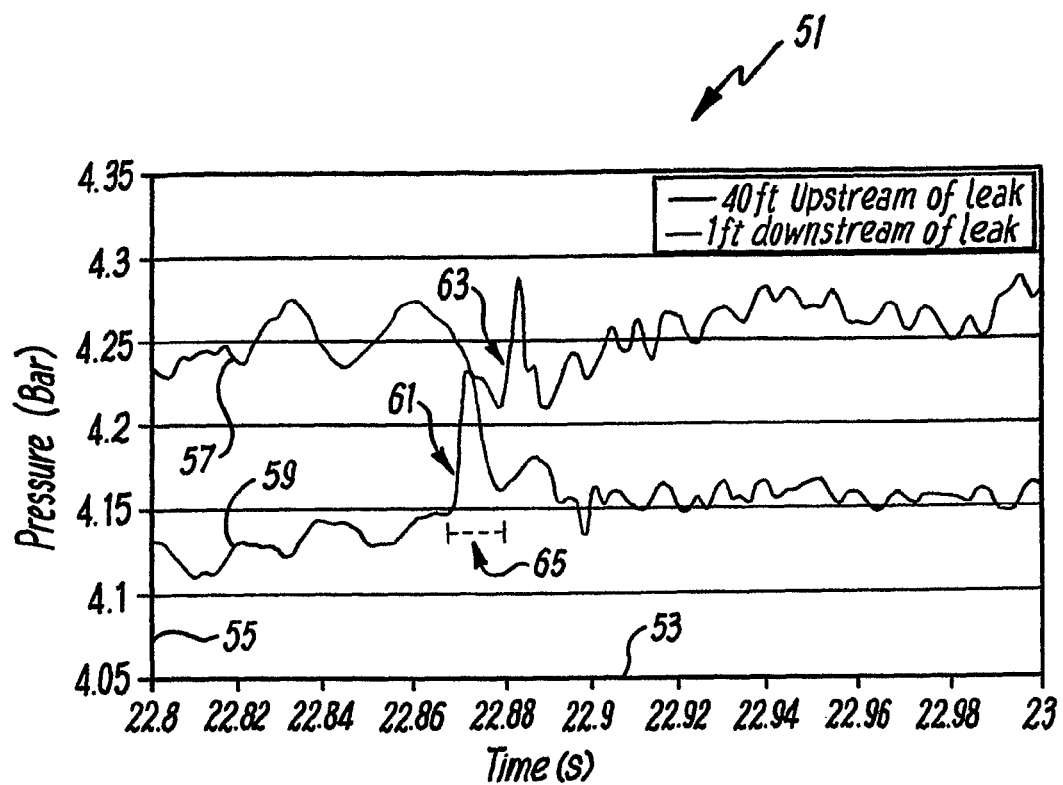
FIG. 6 is a graph of pressure transient responses in accordance with the invention embodiment of FIG. 5A.

In FIG. 6, a graph of pressure traces is generally depicted at 51 resulting from tests carried out using the small-scale test rig of FIG. 5A. The graph 51 comprises an ordinate axis 55 corresponding to pressure and an abscissa axis 53 corresponding to time. A first pressure trace 57 describes the variation of pressure with time measured at a pressure transducer 40 ft upstream of a leak in the test section 7 of FIG. 5A. A second pressure trace 59 describes the pressure variation with time measured at a pressure transducer located 1 ft downstream of the leak of the test section 7 of FIG. 5A.

The pressure traces 57 and 59 both display sharp pressure increases 61 and 63, upstream and downstream of the leak. These two events measured at the transducers, correspond to the arrival of pressure transients at the upstream and downstream transducers 5 and 9 that are generated due to closure of the leak at the instant of sealing. The sharp pressure increase 61 at the transducer 9 downstream of the leak at a time earlier than the corresponding pressure increase 63 at the transducer 5 upstream of the leak indicates that the pressure transient arrived at the downstream transducer first. A time difference 65 of about 10 milliseconds is evident between the arrival of the transient at the upstream and downstream transducers 5 and 9, allowing derivation of the leak location.

Similar tests were carried out on the large-scale system as described in FIG. 5B. Results from tests carried out with the system configured with the upstream pressure transducer located 100 ft (approximately 30 m) upstream of the leak and the downstream transducer located 900 ft (approximately 274 m) downstream of the leak are depicted in FIGS. 7A, 7B and 7C.

Figure 7A:
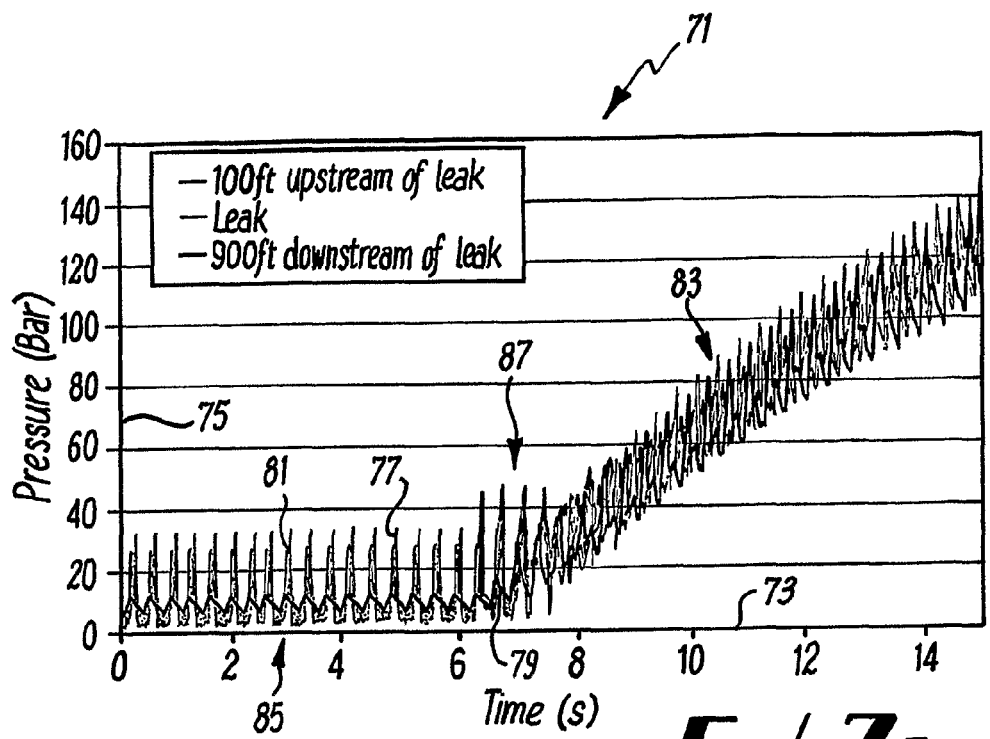
FIG. 7A is a graph of pressure responses in accordance with the embodiment of the invention described in FIG. 5B.
Figure 7B:
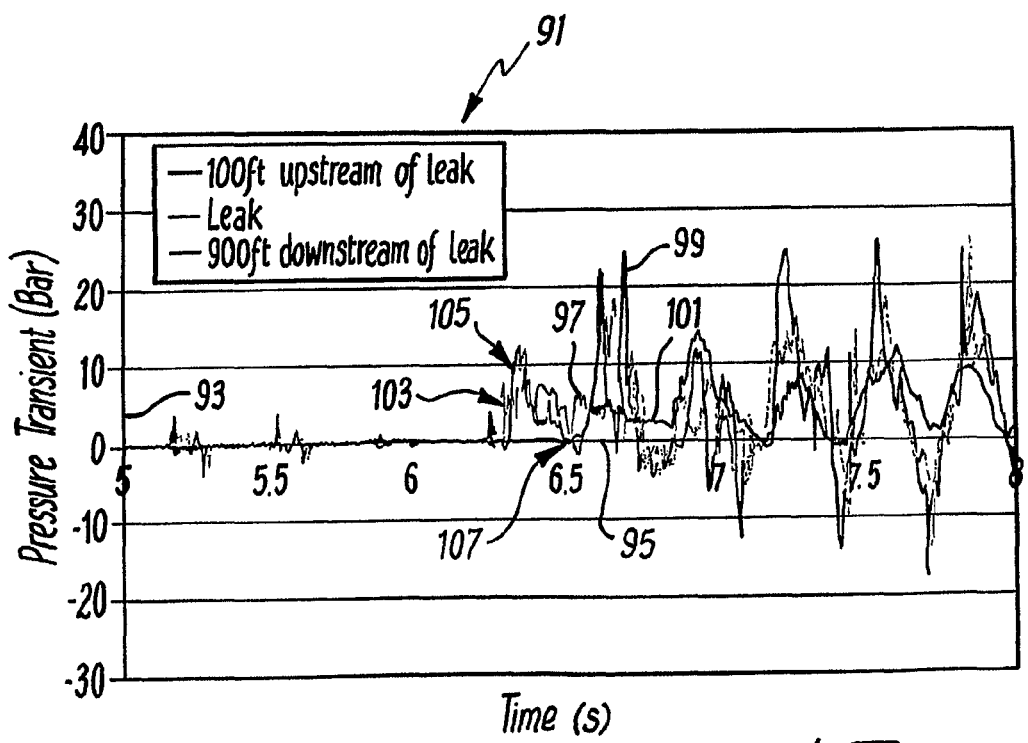
FIG. 7B is a graph of processed pressure transient responses in accordance with the embodiment of FIG. 5B.

FIG. 7A generally depicts at 71 a graph of pressure responses upstream, downstream and at the leak location for the large-scale rig sealing a 1 millimeter hole in a ⅜ inch (approximately 19 mm) stainless steel line. The graph ordinate axis 75 is pressure and the abscissa axis 73 is time. In the graph 71, a pressure trace 77 represents the pressure variation with time measured at the transducer located 100 ft upstream of the leak, the trace 79 represents the pressure variation with time measured at the pressure transducer 900 ft downstream of the leak, and the trace 81 represents the pressure variation with time measured at a pressure transducer located at the leak location.

Each of the traces has three characteristic sections. Firstly, an early portion 85 is characterised by a repeating pulse train of consistent magnitude due to the action of a reciprocating pump. A second event portion 87 of the traces is characterised by increased amplitudes relative to the early portion 85, and, thirdly, a late section 83 of the graph 71 is characterised by a varying pulse train oscillating about a steadily increasing pressure gradient. The event portion 87 results from pressure transient arrivals at the transducers 37 in response to the leak sealing event.

The overall oscillatory behaviour of the pressure variation with time detected on all traces is a result of the type of pump 41 used to pressurise the fluid through the test rig 31. The predictable nature of this oscillation enables it to be filtered out using data processing techniques, and helps to isolate the changes in pressure response corresponding to the pressure transient event alone.

In FIG. 7B, the data set of FIG. 7A is displayed after being subjected to data processing steps. After processing, transient pressure variations due to the leak sealing that were measured at the transducers upstream 99 of the leak, at the leak location 97 and downstream 101 of the leak are well defined compared with the event portion 87 of FIG. 7A displaying the raw data. The traces allow the exact times of arrival of the transient at the transducers to be readily determined.

The method of the large-scale system tests was repeated for the sealing of a 0.3 millimeter leak. Calculation of the location of the leak was carried out in an identical manner. In this case, the leak could be located to between 107 (approximately 32 m) and 137 ft (approximately 42 m). The improvement in accuracy is a result of being able to sustain a higher pressure before the sealing of the leak and, therefore, it was possible to obtain less discrepant values for the characteristic speed of the pressure transient in the pipe before and after sealing.

Practical tests indicate that leak location using this method of pressure transients can be accurate to within a set distance determined by the sampling rate of the transducers. An example of this would be a sample rate of 1 kHz can be used to locate a leak to within a distance of 5.6 m, independent of line length. This method can provide, therefore, a more accurate indication of the leak location along the line compared with the simply timing the sealing elements to the leak in the embodiments described above.

Figure 8A:
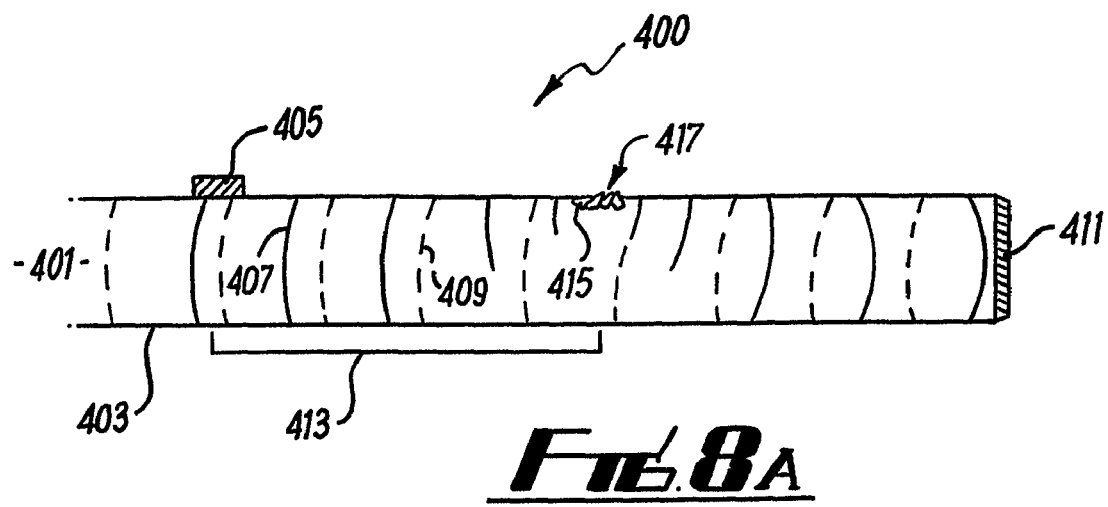
FIG. 8A is a schematic representation of pipeline generating reflected pressure transients in accordance with an embodiment of the invention.
Figure 8B:
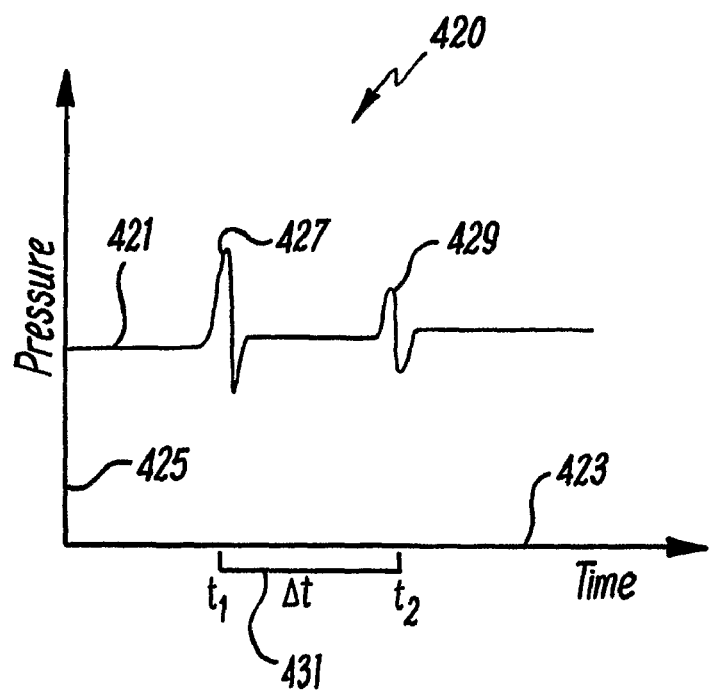
FIG. 8B is a graph of pressure responses including reflected pressure transient responses in accordance with the embodiment of FIG. 8A.

FIGS. 8A and 8B schematically show a further embodiment of the invention, in which the leak position is detected using pressure transient responses measured at a single transducer located along a pipeline. In FIG. 8A, a pipeline 403 has a leak seal 417 formed by sealing elements 415 introduced to fluid 401 in the pipeline. In response to the seal, primary pressure transient waves 407 are generated that propagate through the fluid upstream and downstream at a characteristic speed. At the downstream end of the pipeline 403 there is a solid boundary 411. This boundary acts to reflect the primary pressure transients 407 arriving at the boundary 411 back upstream as reflected pressure transients 409. Pressure variations of the primary and reflected pressure transients 407 and 409 are measured at a pressure transducer 405 mounted to the pipeline upstream of the leak location. Information recorded at the pressure transducer 405 is used to determine the location of the leak relative to the transducer by calculating the distance 413.

FIG. 8B is a graph 420 of the pressure variation with time as measured at the transducer 405. A trace 421 indicates the arrival time of the primary pressure transient by the anomaly 427 and the reflected pressure transient by the anomaly 429 of the trace 421. The time difference 431 between the arrivals is diagnostic of the distance traveled and from this the location of the leak determined.

In this embodiment, the determination of the distance 413 and the leak location is carried out as in the above embodiment of FIGS. 4A and 4B, using the time difference of arrival between the primary and reflected pressure transients. In this case, the position of the transducer 405 is known together with the distance from the transducer to the reflecting boundary 411. The distance 413 from the transducer 405 to the leak location, denoted A, is given by the formula:

$$A = 1/2 \times [2 \times (A+B) - (v_{ch} \times \Delta t)],$$

where the characteristic velocity is $v_{ch}$, $\Delta t$ is time difference between the time of arrival time of the primary transient and the reflected transient upstream transducers, B is the distance from the leak to the reflecting boundary, and $2 \times (A+B)$ is the distance from the upstream transducer to the reflecting boundary and back to the upstream transducer.

Figure 9:
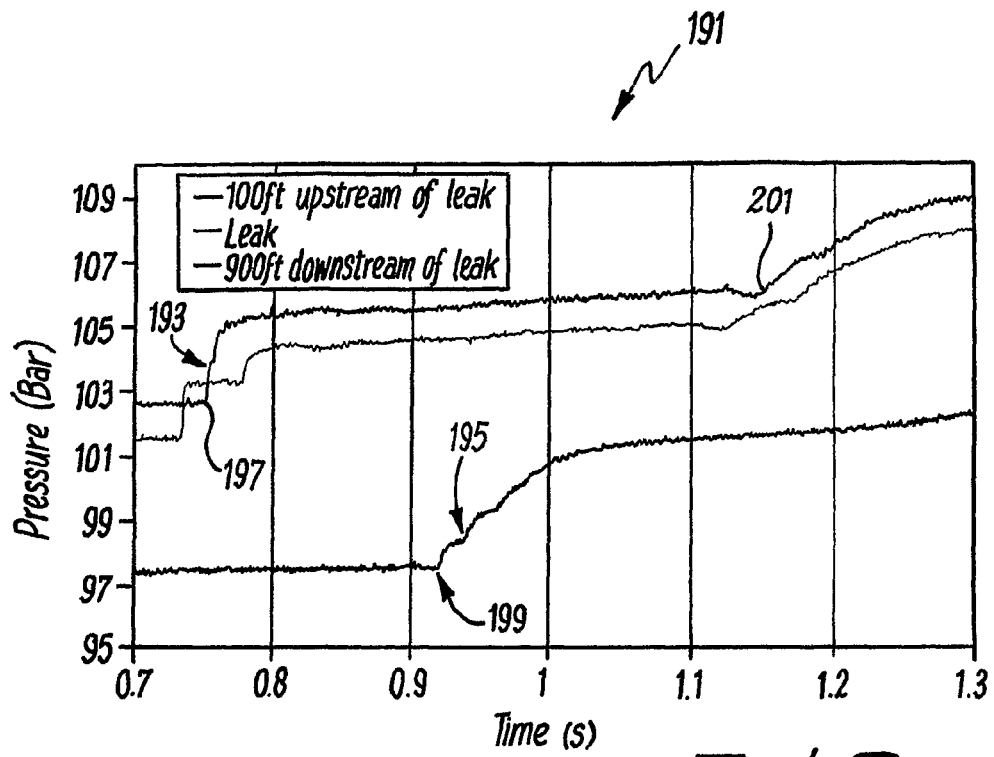
FIG. 9 is a graph of pressure responses in accordance with an embodiment of the invention.

In FIG. 9 is a graph of pressure variation with time measured at a downstream transducer, an upstream transducer and a transducer located at the leak. Upstream of the leak, a second transient event 201 is evident, which is a result of the reflected transient. This demonstrates that information concerning reflected transients may be observed in the pressure variation records and can be usefully interpreted and processed from the noise.

The method of this embodiment enables the location of a leak to be determined using only one pressure transducer. This allows leak location to be carried out using relatively simple equipment.

Figure 10:
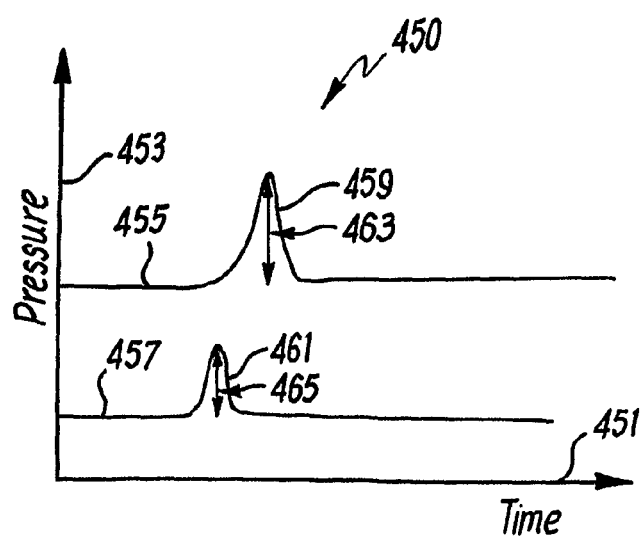
FIG. 10 is a graph representation of pressure transient responses in accordance with an embodiment of the invention.

In an extension of the pressure transient methods in the embodiments of FIGS. 4A and 4B, and of FIGS. 8A and 8B, transient analysis is carried out to determine the size of the leaks in pipelines. With reference to FIG. 10, there is generally depicted at 450 a schematic graph of pressure responses. The graph 450 comprises the abscissa 451 as time and the ordinate axis 453 as pressure. Pressure variation with time is indicated by the traces 455 and 457, which both indicate pressure transient events 459 and 461. The traces may result from different leak sealing events. In this embodiment, the amplitudes 463 and 465 of the pressure transient anomalies 459 and 461 are measured as part of the analysis process.

The amplitudes 463 and 465 are related to leak size through empirical relationships. In general, the sizes of the transients are affected by the pressure contrast between the leak and the surrounding environment at the leak location. Large pressure gradients cause a large transient response upon sealing. Fluid flow through pipes having small size leaks can accommodate such gradients. Larger leaks inhibit high pressures being sustained in the pipeline.

Results from practical tests have helped to establish the empirical relationships between leak size and transient size.

Figure 11:
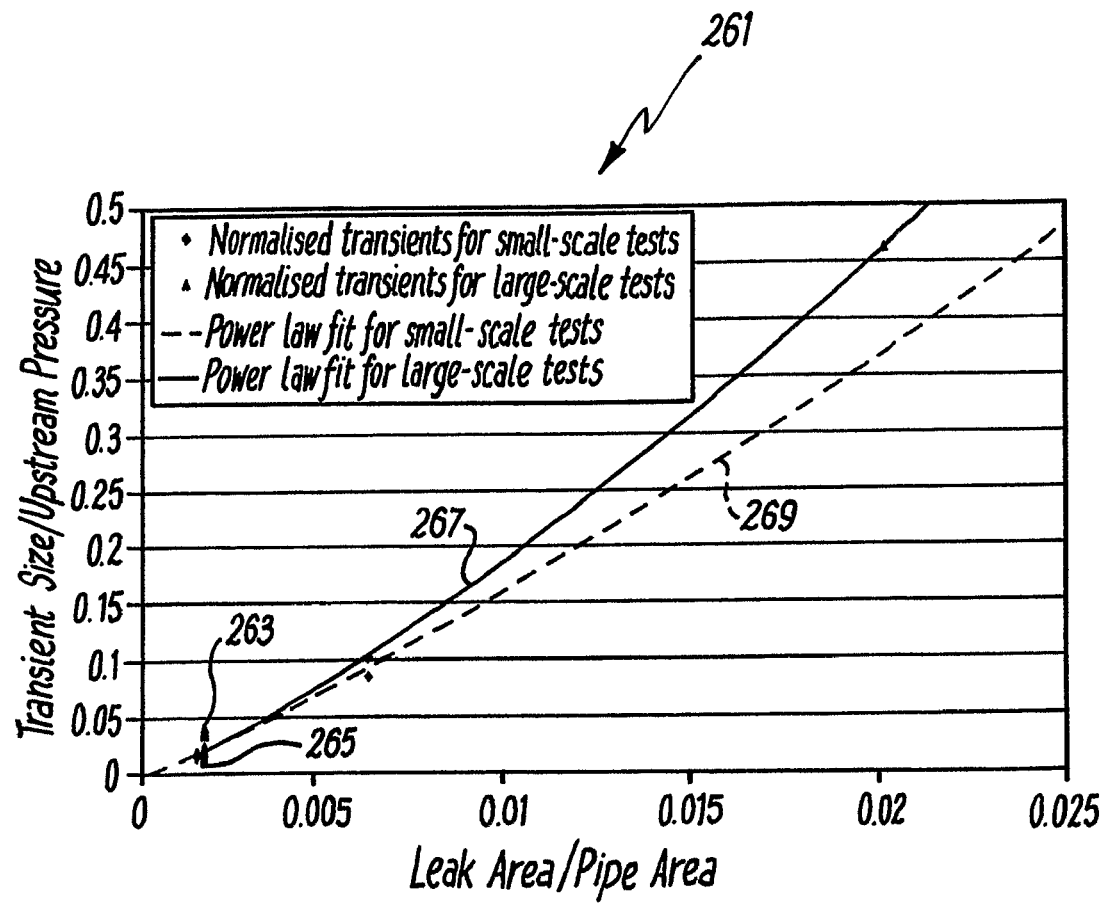
FIG. 11 is a graph relating transient size to leak area in accordance with embodiments of the present invention.

Generally depicted in the graph at 261 in FIG. 11, transient sizes are correlated with leak area. The small scale test data points 243 are marked as diamonds, whereas the large scale test data points 245 are marked as triangles. There exists a power law fit 267 and 269 for the large-scale and small-scale tests. The similarity between the fits shows that there is a predictable relationship between transient size and the area of the leak for different scale systems. Thus, the leak size may be determined from transient size. In this case, the leak area is scaled by the pipe area to allow comparison of data between different scale umbilical leaks.

Analysis of the size of pressure transients in addition to measuring the arrival times and pressure variations of the transients, provides further information concerning the sizes of the leaks in the pipeline. By simply introducing sealing elements remotely, sealing the leak, measuring pressure transients due to the leak, and analysing the size and arrival times at different transducers, the method allows the position of the leak in the pipe to be determined together with an estimate of the size of the leak. This provides clear cost benefits as several pieces of information are obtained from a single practical operation and setup.

In use the methods of the embodiments of the invention may be used together. In FIG. 12, there is, generally depicted at 211, a practical setup using the method of the above embodiments. In this case, there is a vessel 219 and a sub-sea unit 221 residing on the sea floor 225, connected through an umbilical line 213. Mounted to the umbilical line 213 are pressure transducers 217 and 215. Fluid is pumped through the umbilical line 213 from the vessel to the sub sea unit 221 and measurements of pressure are made continuously at the pressure transducers upstream 217 and downstream to screen for the possibility of a leak 227. Upon the occurrence of a leak in the line somewhere between the transducers, at a specific known time, a number of sealing elements are introduced into the pipeline to seal the leak 227. As the leak is sealed, pressure changes are observed at transducers 217 and 227. The pressure changes within the umbilical line 213 are measured as an increase in steady state pressure as pressure builds up towards the limiting material characteristics of the system 211.

Alternatively, the measured pressure changes are transient changes due to the sealing event itself. The time at which these changes occur allows the distance of the sealing elements travelling to the leak to be determined. This provides a first estimate of the leak location.

Secondly, a pressure transient in the pipeline 213 that travels upstream and downstream from the leak location and can be measured at the upstream and downstream pressure transducers 217 and 215. Using the difference in arrival times of the pressure transients at the upstream and downstream transducers 217 and 215, a second calculation of the leak location is performed. Accuracy is subject to having available data regarding the characteristic speed of sound in the pipeline-fluid system 211.

Finally, reflected transients from the sealing event may be monitored at pressure transducers 217 and 215 providing further constraints on the location of the leak. In the case that one of the pressure transducers fails to work, or for other operational reasons, the system 211 provides for detection of leak location using only the one pressure transducer recording data regarding reflected and non-reflected pressure transients.

Careful post acquisition analysis of the pressure transient amplitudes is carried out. A reference set of transient size versus leak size relationships for systems with similar pressure and scale to the system 211 is then used for estimating the size of the leak and understanding the nature and physical scale of the leakage. The pressure transient waves will attenuate as they travel away from the leak location causing a reduction in transient amplitudes measured at large distances from the leak. This effect is taken into account in the calculation of leak size.

A number of features can be introduced to the practical setup 211 that contribute to improved performance and versatility of the leak detection methods. In particular, there may be mounted two pressure transducers to the pipeline upstream of the leak, which together enable detection of the direction of propagation of the pressure transient waves. These data may be used to account for interference effects and reflection of the transient signals.

In addition, in order to accurately determine the characteristic speed of pressure transients and speed of fluid flow, there may, for example, be provided a system comprising pump at the top of the line for providing a repeating pressure transient signal to the line, together with a flow speed meter, and measurement instruments, such as flow and pressure transducers. Such a system may be employed at a field site for testing and determining characteristics of the fluid-pipeline system before and after sealing a leak. Use of the pump system during the leak sealing and leak location provides for detection of a transient after signal processing.

Furthermore, measurement equipment is designed to interface with existing systems used in industry and pressure transients could be decoded using known mud-pulse telemetry systems, or similar systems.

A further sealing element injection and retrieval system is also beneficial in order to keep the fluid in the pipeline free of any contaminants, and minimise the exposure of sealing elements to the environment around the pipeline, such as the seawater.

By combining the methods for locating the leak in the pipeline described in the above embodiments, location of a leak may be carried out with a high degree of accuracy. The possibility of built-in redundancy provides a number of advantages and methods for determining the position of the leak with alternative means should if it be necessary to do so.

This is a desirable characteristic of a system and method of use when working in demanding environments. Furthermore, the system supports a method for remotely repairing, locating, and sizing a leak in an umbilical line or pipeline in a single process, which saves time, effort and expense. In particular, the method saves significant operational downtime.

A number of improvements or modifications may be made to the embodiments herein described without departing from the intended scope of the present invention.

The invention claimed is:

1. A method for determining the location of a fluid leak in a pipeline, the method comprising the steps of:
   introducing a plurality of sealing elements into the fluid flowing through the pipeline at a first location upstream of the leak, at least some of the sealing elements being drawn towards the leak to cause a sealing event which reduces fluid seepage from the leak;
   detecting a pressure change in the flowing fluid due to the sealing event;
   using time data associated with the pressure change to derive leak location information.

2. The method as claimed in claim 1 comprising the additional step of measuring the time between the introduction of the sealing elements into the pipeline and the pressure change.

3. The method as claimed in claim 2 comprising the additional step of using rate of flow of fluid in the pipeline to calculate a distance between the first location and the leak location.

4. The method of claim 1, wherein the pressure change is detected using a single pressure transducer located in the pipeline.

5. The method of claim 1, wherein the pressure change is detected using a plurality of pressure transducers located in the pipeline.

6. The method of claim 1 further comprising the step of measuring flow rate of the fluid in the pipeline.

7. The method of claim 1 further comprising the step of calculating the leak location using the time of introduction of the sealing elements, the time of the pressure change, and the flow rate of the fluid.

8. The method of claim 1, wherein the pressure change is a change of steady state pressure of the fluid in the pipeline.

9. The method of claim 1, wherein the pressure change is a transient pressure change of the fluid in the pipeline.

10. The method of claim 1, wherein the detected pressure change is a combination of a change of steady state pressure of the fluid in the pipeline and a transient pressure change of the fluid in the pipeline.

11. The method of claim 9, further comprising the steps of:
    detecting a first signal due to a pressure transient caused by the sealing event;
    detecting a second signal due to a pressure transient caused by the sealing event;
    deriving leak location information using time data associated with the first and second signals.

12. The method as claimed in claim 11, wherein the first signal is detected by a first pressure transducer at a location upstream of the leak, and the second signal is detected by a second pressure transducer at location downstream of the leak.

13. The method as claimed in claim 12, wherein leak location information is derived from a characteristic pressure transient speed in the fluid, the time of detection of pressure transients at the first and second transducers, and the location of the first and second transducers.

14. The method as claimed in claim 11, wherein the first signal is a primary pressure transient detected by a pressure transducer, and the second signal is a reflected pressure transient detected by the pressure transducer.

15. The method as claimed in claim 1 comprising the further step of measuring a characteristic pressure transient speed in the fluid by generating a pressure transient at a known location and time, and detecting a resulting signal at a pressure transducer.

16. The method as claimed in claim 1 comprising the additional steps of measuring the amplitude of a pressure transient caused by the sealing event, and deriving leak size information from the measured amplitude.

17. A system for deriving the location of a fluid leak in a pipeline, the system comprising:
    an inlet for allowing a plurality of sealing elements to be introduced into fluid flowing through a pipeline at a first location upstream of the leak, at least some of the sealing elements being drawn towards the leak to cause a sealing event which reduces fluid seepage from the leak;
    means for detecting a pressure change in the flowing fluid due to the sealing event;
    means for deriving leak location information from time data associated with the pressure change.

18. The system as claimed in claim 17, wherein the means for detecting a pressure change is a single pressure transducer located in the pipeline.

19. The system as claimed in claim 18, wherein the single pressure transducer is located upstream of the leak.

20. The system as claimed in claim 17, wherein the means for detecting a pressure change comprises a first pressure transducer located upstream of the leak and a second pressure transducer located downstream of the leak.

21. The system of claim 17 further comprising means for measuring the flow rate of fluid in the pipeline.

22. The system of claim 17 further comprising means for generating a pressure transient in the pipeline at a known time and location.

23. The system of claim 17 further comprising a pump to generate a pressure transient in the pipeline at a known time and location.

24. A method for determining the size of a fluid leak in a pipeline, the method comprising the steps of:
    introducing a plurality of sealing elements into the pipeline at a first location upstream of the leak, at least some of the sealing elements being drawn towards the leak to cause a sealing event which reduces fluid seepage from the leak;
    detecting a pressure transient signal caused by the sealing event;
    measuring an amplitude of the pressure transient signal;
    deriving leak size information from the amplitude of the pressure transient signal.

25. A system for deriving the location or size of a fluid leak in a pipeline, the system comprising:
    an inlet to introduce a plurality of sealing elements into fluid flowing through a pipeline at a first location upstream of the leak, wherein at least some of the sealing elements are drawn to the leak to cause a sealing event which reduces fluid seepage from the leak;
    at least one pressure transducer to detect a pressure change in the flowing fluid due to the sealing event;
    a computer to derive leak location or size information from time data associated with the pressure change.

26. The system as claimed in claim 25, comprising a single pressure transducer located in the pipeline.

27. The system as claimed in claim 25, wherein at least one of the pressure transducers is located upstream of the leak.

28. The system as claimed in claim 25, comprising a first pressure transducer located upstream of the leak and a second pressure transducer located downstream of the leak.

29. The system of claim 25 further comprising a flow transducer to measure the flow speed rate of fluid in the pipeline.

* * * * *